United States Patent [19]
Iwashita et al.

[11] Patent Number: 5,989,622
[45] Date of Patent: Nov. 23, 1999

[54] INTERMITTENT COATING METHOD AND APPARATUS THEREFOR

[75] Inventors: Yuji Iwashita; Seiichi Endo; Keiichi Morimoto, all of Kitasaku-gun, Japan

[73] Assignee: TDK Corporation, Japan

[21] Appl. No.: 08/729,958

[22] Filed: Oct. 15, 1996

[30] Foreign Application Priority Data

Oct. 20, 1995 [JP] Japan ................................. 7-295977

[51] Int. Cl.[6] .............................. B05D 1/26; B05D 1/32; B05D 5/12
[52] U.S. Cl. ........................ 427/58; 427/256; 427/282; 427/358; 427/420
[58] Field of Search .............................. 427/8, 58, 208.6, 427/358, 256, 282, 420, 287; 118/679, 683, 684, DIG. 4, 410, 302, 669

[56] References Cited

U.S. PATENT DOCUMENTS

| | | | |
|---|---|---|---|
| 4,123,572 | 10/1978 | Gidley | 427/272 |
| 4,729,858 | 3/1988 | Chino et al. | 264/37 |
| 5,360,629 | 11/1994 | Milbourne et al. | 427/8 |

FOREIGN PATENT DOCUMENTS

| | | |
|---|---|---|
| 62-117669 | 5/1987 | Japan . |
| 1-184069 | 7/1989 | Japan . |
| 6-226173 | 8/1994 | Japan . |

*Primary Examiner*—Frederick Parker
*Attorney, Agent, or Firm*—Lerner, David, Littenberg, Krumholz & Mentlik, LLP

[57] ABSTRACT

The method is related to intermittent coating capable of distinctly defining a boundary between a coated region and an uncoated region on a web, to thereby intermittently form a coated film on the web with increased accuracy and efficiency. A coating liquid feed pump is arranged so as to alternately communicate with a circulation line and a pocket of an extrusion type coater through a directional control valve, resulting in coating liquid being intermittently fed to the pocket and then forced out of a slit, so that coated regions and uncoated regions may be alternately formed on a conductive sheet material. During interruption of communication between the pocket and the feed pump, the pocket is permitted to communicate via a discharge pipe and a shut-off valve with a sub-tank to reduce a pressure of coating liquid in the pocket, to thereby prevent undesired feeding of coating liquid to the uncoated region beyond an end position of the coated region.

5 Claims, 5 Drawing Sheets

SOLENOID VALVE OPERATION

INTERMITTENT COATING METHOD AND APPARATUS THEREFOR

BACKGROUND OF THE INVENTION

This invention relates to intermittent coating techniques using an extrusion coater, and more particularly to an intermittent coating method adapted to intermittently apply coating liquid to a web continuously traveling to alternately form the web with coated regions which are deposited thereon with the coating liquid and uncoated regions which are not deposited thereon with the coating liquid and an apparatus therefor. More specifically, the present invention relates to an intermittent coating method used in manufacturing of a lithium ion secondary cell and an apparatus therefor.

An electrode which has been conventionally used for a lithium ion secondary cell of a cylindrical shape is typically constructed in such a manner as shown in FIG. 9. More particularly, the electrode includes a current collector or conductive sheet 1 which is formed on each of both surfaces thereof with a coated film 2 containing an active material while being partially exposed. Then, the conductive sheet 1 is provided on a portion thereof thus exposed with a lead 3. For manufacturing of such an electrode, typically, a lengthy conductive sheet material or web is intermittently coated on one surface thereof with a coating liquid containing an active material, so that coated regions which are deposited thereon with the coating liquid and uncoated regions which are not deposited thereon with the coating liquid may be alternately formed on the conductive sheet material, followed by drying of the conductive sheet material. Substantially the same procedure is repeated on the other surface of the conductive sheet material and then it is cut into a plurality of the above-described conductive sheets 1. Then, the lead 3 is mounted on each of the conductive sheets 1, resulting in the electrode being provided.

Intermittent coating or application of the coating liquid onto the conductive sheet material has been conventionally carried out using techniques disclosed in Japanese Patent Application Laid-Open Publication No. 184069/1989 or Japanese Patent Application Laid-Open Publication No. 226173/1994. More particularly, Japanese Patent Application Laid-Open Publication No. 184069/1989 discloses coating techniques wherein feeding of coating liquid from a coating liquid retention section constructed of a doctor blade and a support member to an aluminum foil is controlled by a shutter member and then coated on the aluminum foil by means of the doctor blade. Japanese Patent Application Laid-Open Publication No. 226173/1994 discloses coating techniques wherein coating liquid stored in a hopper is adhered to a coating roll while being controlled by a doctor roll and then the coating liquid adhered to the coating roll is applied to a base sheet carried on a backing roll.

Also, there is known Japanese Patent Application Laid-Open Publication No. 117669/1987 as other prior art, which discloses coating techniques wherein a bypass system is arranged for returning coating liquid discharged from a feed pump. A coating head is filled therein with coating liquid prior to application of the coating liquid and a directional control valve is changed over at the time when the application is started, resulting in the coating liquid being fed to the coating head.

Unfortunately, the coating techniques disclosed in Japanese Patent Application Laid-Open Publication No. 184069/1989 have a disadvantage of causing the coating liquid to leak between a lower surface of the shutter member and the support member during closing operation of the shutter member and failing to satisfactorily cut or shut off the coating liquid at an end position of a coated region, leading to undesired feeding of the coating liquid to an uncoated region beyond the end position of the coated region.

Also, the intermittent coating techniques disclosed in Japanese Patent Application Laid-Open Publication No. 226173/1994 cause forming of a stripe-like pattern in a coated film and/or a variation in thickness of the coated film due to coating liquid adhered to a portion of the doctor roll beyond an edge of the doctor roll, because the doctor roll is vertically displaced or the doctor roll is selectively moved toward or away from the coating roll. Forming of such a stripe-like pattern or a variation in thickness of the coated film may be eliminated by washing the doctor roll. However, this requires interruption of running or operation of a coating apparatus, leading to a deterioration in operation efficiency.

The coating techniques disclosed in each of Japanese Patent Application Laid-Open Publication Nos. 184069/1989 and 226173/1994 exhibit another problem that the coating liquid is varied in viscosity particularly when it is a solid-liquid dispersion paint containing an active material and/or a conductive material because it is exposed to an ambient atmosphere prior to application thereof, leading to a variation in coating properties of the coating liquid, resulting in a thickness of a coated film being rendered non-uniform.

Further, it was found that the above-described coating techniques disclosed in Japanese Patent Application Laid-Open Publication No. 117669/1987 have a disadvantage that application of the coating techniques to intermittent coating fails to permit the coating liquid to be satisfactorily cut or shut off at an end position of a coated region, leading to undesired feeding of the coating liquid to an uncoated region as well, resulting in a coated film formed being deteriorated in quality as in Japanese Patent Application Laid-Open Publication 184069/1989 described above. Thus, application of the coating techniques to intermittent coating fails to permit changing-over of the directional control valve at the end position of the coated region to reduce a pressure of coating liquid in a slit to a predetermined level, to thereby cause continuous feeding of the coating liquid until the pressure is reduced to the level.

SUMMARY OF THE INVENTION

The present invention has been made in view of the foregoing disadvantages of the prior art.

Accordingly, it is an object of the present invention to provide an intermittent coating method which is capable of efficiently forming a coated film while distinctly defining a boundary between a coated region and an uncoated region with increased accuracy.

It is another object of the present invention to provide an intermittent coating method which is capable of intermittently forming a coated film of a uniform thickness.

It is another object of the present invention to provide an intermittent coating apparatus which is capable of positively providing a coated film while distinctly defining a boundary between a coated region and an uncoated region with increased accuracy.

In accordance with a first aspect of the present invention, an intermittent coating method which uses an extrusion coater provided with a pocket and a slit communicating with the pocket, wherein an opening of the slit of the extrusion coater is opposite to one surface of a continuously traveling web in a direction perpendicular to a direction of traveling of the web, is provided. The intermittent coating method comprises the steps of operating a coating liquid feed pump so that the coating liquid feed pump alternately communicates with a circulation line connected to a coating liquid tank and the pocket, resulting in the coating liquid discharged by the coating liquid feed pump being intermittently applied from the pocket to the web via the slit; and rendering the pocket open through an shut-off valve arranged in a discharge line to reduce a pressure of coating liquid in the pocket when the coating liquid feed pump is operated so as to communicate with the circulation line to isolate the pocket from the coating liquid feed pump.

In accordance with a second aspect of the present invention, an intermittent coating apparatus is provided. The intermittent coating apparatus includes an extrusion coater provided with a pocket and a slit communicating with the pocket, a tank for storing coating liquid therein, a feed pump for discharging coating liquid in the coating liquid tank therefrom, a circulation line, a feed line connected to the feed pump, a changing means for changing a flow direction of the coating liquid discharged by the feed pump so as to permit the feed line to alternately communicate with the pocket of the extrusion coater and the circulation line, a discharge line connected to the pocket, and a shut-off means operable synchronously with operation of the changing means, to thereby open the discharge line when the feed pump is communicated through the changing means with the circulation line.

Also, in accordance with the first aspect of the present invention, an intermittent coating method which uses an extrusion coater provided with a pocket and a slit communicating with the pocket, wherein an opening of the slit of the extrusion coater is opposite to one surface of a continuously traveling web in a direction perpendicular to a direction of traveling of the web, is provided. The intermittent coating method comprises the step of operating a coating liquid feed pump so that the coating liquid feed pump alternately communicates with a circulation line connected to a coating liquid tank and the pocket, resulting in the coating liquid discharged by the coating liquid feed pump being intermittently applied from the pocket to the web via the slit, wherein intermittent coating of the coating liquid is carried out so that a start position of the coating and an end position thereof are defined on a masking section formed on the web.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be detailedly described with reference to the accompanying drawings.

Figure 1:
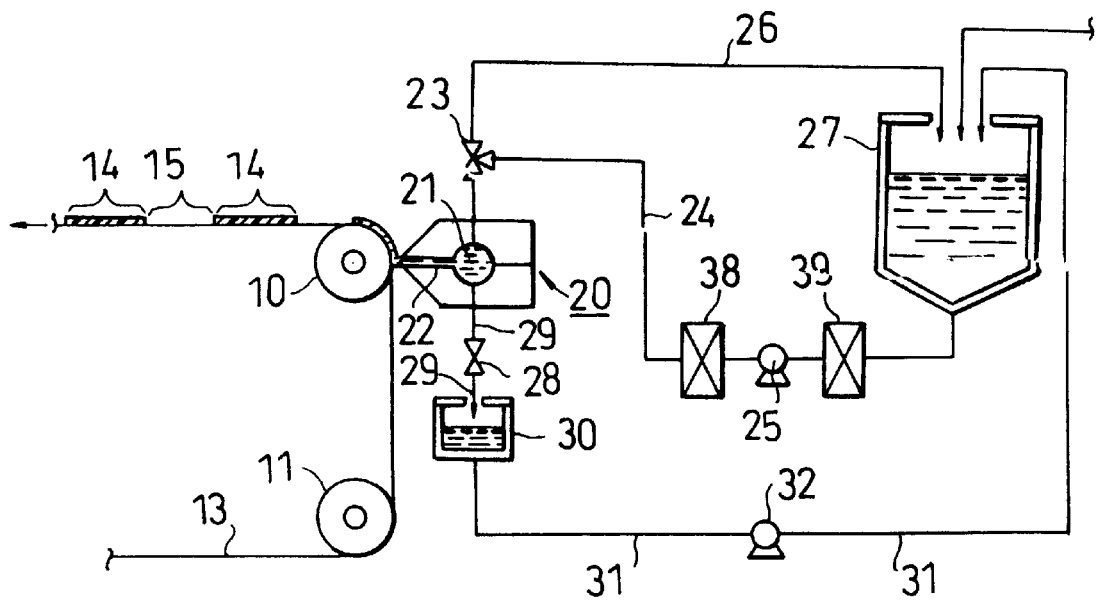
FIG. 1 is a schematic view generally showing an embodiment of an intermittent coating apparatus according to the present invention.

Referring first to FIGS. 1 and 2, an embodiment of an intermittent coating apparatus according to the present invention is illustrated.

An intermittent coating apparatus of the illustrated embodiment, as shown in FIG. 1, includes back-up rolls 10 and 11, on which a lengthy conductive sheet material 13 called a web and made of a copper foil, an aluminum foil or the like is carried so that it may travel in a direction indicated by an arrow in FIG. 1. The intermittent coating apparatus of the illustrated embodiment also includes an extrusion coater 20 arranged in proximity to the back-up roll 10. As described hereinafter, the conductive sheet material 13 is driven by a travel mechanism (not shown) such as a motor or the like, to thereby be permitted to travel and intermittently coated thereon with coating liquid by means of the extrusion coater 20, so that the coating liquid may be intermittently applied to the conductive sheet material 13, resulting in coated regions 14 of a predetermined length being intermittently formed on the conductive sheet material 13, with non-coated regions 15 of a predetermined length being interposedly formed therebetween in an intermittent manner.

The extrusion coater 20 is formed with a pocket 21 and a slit 22 communicating with the pocket 21. The slit 22 is arranged so as to extend in a direction perpendicular to a direction of traveling of the conductive sheet material 13. The slit 22 has an opening or outlet arranged opposite to one surface of the conductive sheet material 13 in the direction perpendicular to the traveling direction of the sheet material 13 in proximity to the back-up roll 10. The pocket 21 of the extrusion coater 20 is connected to a feed pipe or feed line 24 which is provided with a three-way directional control valve 23, resulting in the pocket 21 being enabled to communicate with a discharge port of a feed pump 25 through the feed line 24. The three-way directional control valve 23 also has a circulation pipe or circulation line 26 connected thereto, so that the feed line 24 can communicate with a coating liquid tank 27 through the circulation line 26.

In FIG. 1, reference numerals 38 and 39 designate filter units which may be arranged in the feed line 24 on both of upstream and downstream sides of the feed pump 25 in a manner to interpose the feed pump 25 therebetween, as required. Also, a reserve or auxiliary coating liquid circulation pump, a reserve or auxiliary coating liquid circulation line and a reserve or auxiliary filter unit may be arranged upstream to the feed pump 25 as required.

The three-way directional control valve 23 includes an actuator (not shown) such as a solenoid or the like, so that actuation of the actuator leads to a changing-over operation of the valve 23, to thereby permit the feed line 24 and therefore the feed pump 25 to selectively communicate with either the pocket 21 or the circulation line 26. The actuator of the three-way directional control valve 23 is connected to a controller (not shown), resulting in the valve 23 being controlled by the controller. The feed pump 25 may comprise a fixed delivery pump driven by a motor or the like, which may be controlled by a controller (not shown) connected thereto. The coating liquid tank 27 is adapted to store therein coating liquid containing an active material and a binder and used for forming of an electrode. However, it is a matter of course that the coating liquid may be prepared for applications other than such electrode forming.

The circulation line 26 may be formed with any desired diameter and length. However, these dimensions are preferably determined so as to permit a pressure of the coating liquid obtained upstream to the directional control valve 23 to be maintained substantially constant before and after the changing operation of the directional control valve 23. Thus, the intermittent coating apparatus of the illustrated embodiment may be desirably constructed so that a flow resistance or loss of head in the circulation line 26 is rendered equal to a flow resistance or loss of head defined between the three-way directional control valve 23 and the opening or outlet of the slit 22 of the extrusion coater 20. Alternatively, the circulation line 26 may be provided with a pressure regulating valve or the like, so that a flow resistance in the circulation line 26 may be variably set at a suitable level as desired.

The pocket 21 of the extrusion coater 20 is also connected to a discharge pipe 29 provided with a shut-off valve 28, resulting in the pocket 21 being enabled to communicate with a sub-tank 30 through the discharge pipe 29. The shut-off valve 28 includes an actuator (not shown) such as a solenoid or the like as in the three-way directional control valve 23 described above, so that actuation of the actuator permits the discharge pipe 29 to be selectively opened or closed. The actuator of the shut-off valve 28 is connected to a controller (not shown), which acts to control the actuator, so that the shut-off valve 28 may be operated synchronously with the three-way directional control valve 23. When the three-way directional control valve 23 is changed over to communicate the feed pump 25 with the circulation line 26, at the same time the shut-off valve 28, as will be detailedly described hereinafter with reference to FIG. 2, is rendered open and then kept open for a predetermined period of time $\tau_0$ smaller than a predetermined period of time $\tau_2$ until the three-way directional control valve 23 is changed over to communicate the feed pump 25 with the pocket 21. The discharge pipe 29 and shut-off valve 28 are so constructed that the discharge pipe 29 and the shut-off valve 28 kept open have a total flow resistance less than a flow resistance in the slit 22. A plurality of such discharge pipes 29 and shut-off valves 28 may be arranged depending on a configuration of the extrusion coater 20.

The sub-tank 30 is so constructed that an interior thereof is kept at an atmospheric pressure or a predetermined negative pressure less than the atmospheric pressure. The pressure may be set at a level which permits a certain amount of paint or coating liquid required for starting to form a coated region at a predetermined position to remain in the slit 22 and pocket 21 of the extrusion type coater 20. The sub-tank 30 acts to temporarily store therein coating liquid introduced from the pocket 21 through the discharge pipe 29 thereinto. The sub-tank 30 may be connected at a lower portion thereof to a return line 31 provided with a return pump 32, resulting in the sub-tank 30 communicating with the coating liquid tank 27 through the return line 31, as required. Also, the sub-tank 30 may be provided thereon with a sensor (not shown) for detecting the amount of coating liquid stored therein. The sensor may be connected to a controller (not shown) together with the return pump 32, so that the return pump 32 may be controlled by the controller in response to an output of the sensor, to thereby return coating liquid in the sub-tank 30 to the coating liquid tank 27. The discharge pipe 29, shut-off valve 28, sub-tank 30, return line 31 and return pump 32 thus arranged cooperate with each other to provide a discharge line. The sub-tank 30, return line 31 and return pump 32 may be used to constitute a part of the thus-formed discharge line as required.

Alternatively, the discharge line may be constituted by combination of a line exhibiting a flow resistance less than that of the slit 22 with the shut-off valve 28, to thereby permit the pocket 21 to communicate directly with the coating liquid tank 27 without interposing the sub-tank 30 therebetween.

Figure 2A:
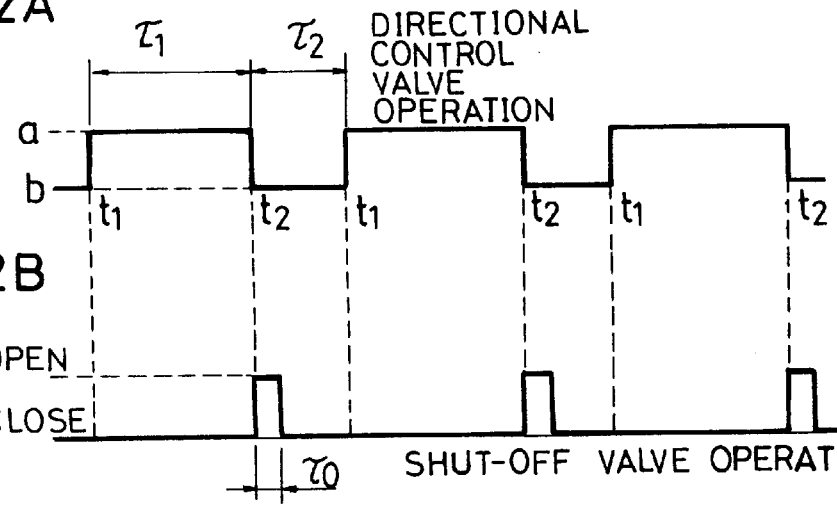
FIGS. 2A and 2B are timing charts showing a manner of operation of the intermittent coating apparatus of FIG. 1.
Figure 2B:
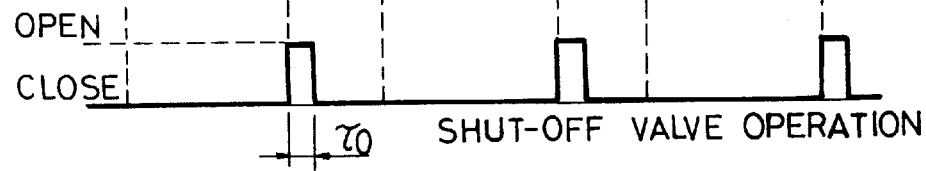

Now, the manner of operation of the intermittent coating apparatus of the illustrated embodiment thus constructed will be described hereinafter with reference to FIGS. 1, 2A and 2B.

The feed pump 25 is activated to discharge coating liquid in a predetermined amount per unit time and the three-way directional control valve 23 and shut-off valve 28 are synchronously operated. More particularly, as shown in FIGS. 2A and 2B, the three-way directional control valve 23 is changed over at a predetermined cycle to alternately communicate the feed pump 25 with the pocket 21 and circulation line 26, so that the feed pump 25 is permitted to communicate with the pocket 21 for a predetermined period of time $\tau_1$ when the valve 23 is changed over to a valve position (a) and subsequently communicate with the circulation line 26 for a predetermined period of time $\tau_2$ when the valve 23 is in a valve position (b). Thus, during the period $\tau_1$, coating liquid is fed to the pocket 21 and then forced out of the slit 22, so that a coated region or coated film 14 may be formed over a predetermined length on the conductive sheet material 130, and during the period $\tau_2$, the feed pump 25 is kept communicating with the circulation line 26 to interrupt feeding of coating liquid to the pocket 21, resulting in an uncoated region 15 being formed on the conductive sheet material 13. Such operation is repeated, so that the coated regions 14 and uncoated regions 15 may be alternately formed while being mutually interposed therebetween.

During the period $\tau_2$, coating liquid discharged by the feed pump 25 is returned through the circulation line 26 to the coating liquid tank 27, so that a pressure of coating liquid in proximity to the three-way directional control valve 23 of the feed line 24 may be maintained at an appropriate value or level. This minimizes a variation in pressure of coating liquid when the three-way directional control valve 23 is changed at time $t_1$ to communicate the feed pump 25 with the pocket 21, resulting in a start position of the coated region 14 being distinctly defined or formed.

The shut-off valve 28 is operated at the same cycle as the three-way directional control valve 23 in response to the change-over operation of the three-way directional control valve 23. Thus, when the three-way directional control valve 23 is changed at time $t_2$ to communicate the feed pump 25 with the circulation line 26, at the same time the shut-off valve 28 is rendered open and then kept open for a predetermined period of time $\tau_0$ smaller than the period $\tau_2$, resulting in the pocket 21 communicating with the sub-tank 30. This renders an interior of the pocket 21 open, to thereby reduce a pressure of coating liquid, resulting in preventing undesired feeding of coating liquid to the uncoated region beyond the coated region, so that an end position of the coated region 14 may be distinctly defined.

Figure 3:
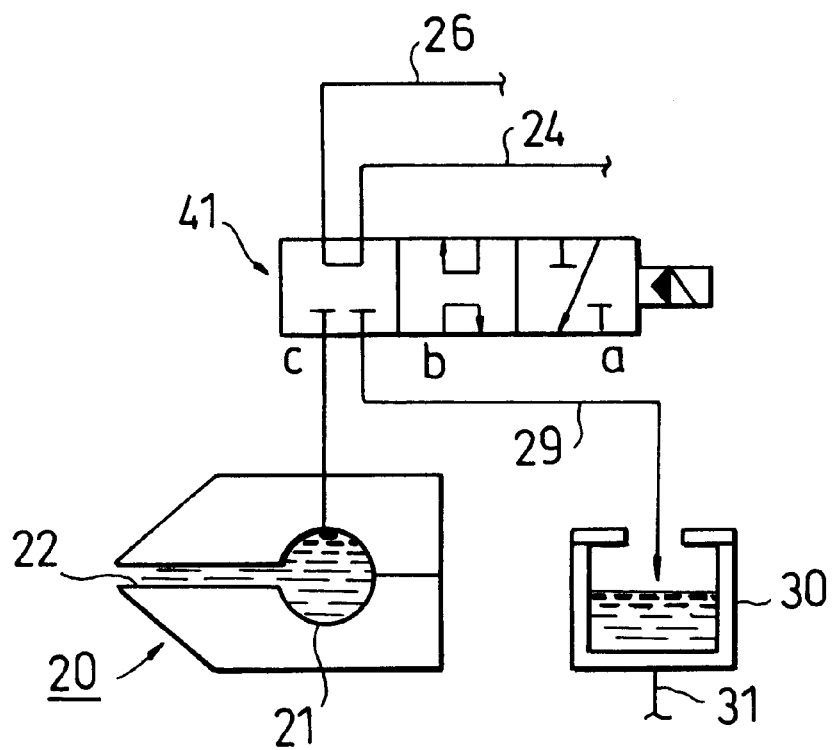
FIG. 3 is a schematic view showing another embodiment of an intermittent coating apparatus according to the present invention.
Figure 4:
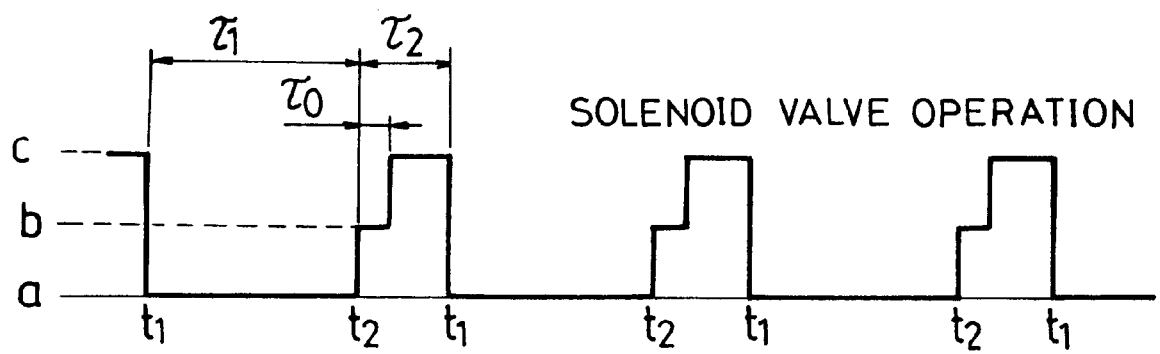
FIG. 4 is a timing chart showing a manner of operation of the intermittent coating apparatus of FIG. 3.

Referring now to FIGS. 3 and 4, another embodiment of an intermittent coating apparatus according to the present invention is illustrated.

An intermittent coating apparatus of the illustrated embodiment includes a solenoid operated directional control valve 41 of a four-port connection three-position type, of which four ports have a feed line 24, a circulation line 26, a discharge pipe 29 and a pocket 21 connected thereto, respectively. The solenoid operated directional control valve 41 permits the feed line 24 to communicate with the pocket 21 when it is changed over to a valve position (a) to interrupt or block up the circulation line 26 and discharge pipe 29. Then, when the solenoid operated directional control valve 41 is changed over to a valve position (b), it permits the feed line 24 to communicate with the circulation line 26 and the pocket 21 to communicate with the discharge pipe 29. Further, at a valve position (c), the solenoid operated directional control valve 41 permits the feed line 24 to communicate with the circulation line 26 and shuts off or interrupts communication between the pocket 21 and discharge pipe 29.

Thus, in the illustrated embodiment, the solenoid operated directional control valve 41 is changed over among the valve positions (a), (b) and (c) in turn at a predetermined cycle as shown in FIG. 4, so that coated regions 14 and uncoated regions 15 may be repeatedly formed in a manner to alternate with each other, with the uncoated regions 15 being interposedly arranged between the coated regions 14 so as to be spaced from one another. Thus, when the solenoid operated directional control valve 41 is changed over to the valve position (a), the pocket 21 is fed with coating liquid, which is then forced out of the slit 22 to provide the coated region 14. Then, changing-over of the solenoid operated directional control valve 41 to the valve position (b) permits the pocket 21 to communicate with the discharge pipe 29, so that the pocket 21 is rendered open with respect to a discharge line or is permitted to communicate with the discharge line, resulting in a pressure therein being reduced. Concurrently, this permits the feed line 24 to communicate with the circulation line 26, resulting in flowing of coating liquid from the slit 22 being rapidly interrupted, so that an end position of the coated region 14 may be distinctly defined.

Then, when the solenoid directional control valve 41 is changed over to the change-over position (c), the feed line 24 is permitted to communicate with the circulation line 26 and the pocket 21 is closed. This results in coating liquid discharged by a feed pump (25) being returned through the circulation line 26 to a coating liquid tank (27), so that a pressure of coating liquid in proximity to the solenoid operated directional control valve 41 of the feed line 24 may be maintained at an appropriate level, during which the uncoated region 15 is formed. Thereafter, the solenoid operated directional control valve 41 is changed-over to the valve position (a) again, so that the above-described operation is repeated, resulting in the coated regions 14 and uncoated regions 15 being alternately defined in a successively repeated manner.

Figure 5:
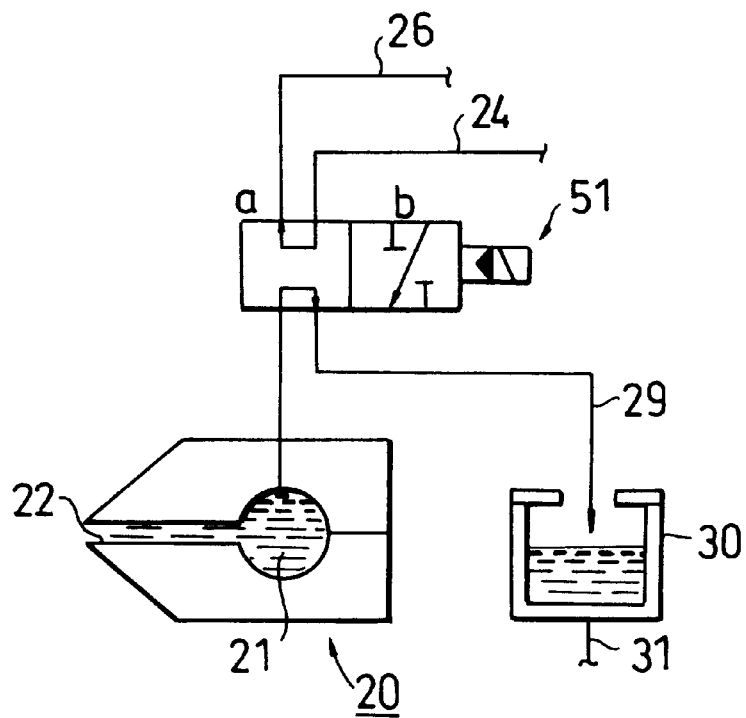
FIG. 5 is a schematic view showing a modification of the intermittent coating apparatus of FIG. 3.
Figure 6:
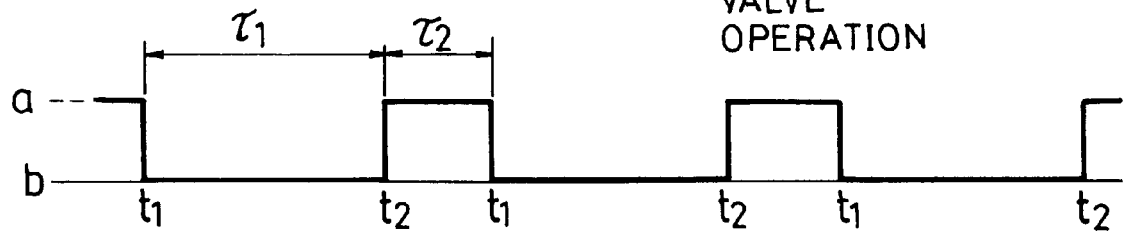
FIG. 6 is a timing chart showing a manner of operation of the intermittent coating apparatus of FIG. 5.

The illustrated embodiment, as described above, has the four-port connection three-position type of the solenoid operated directional control valve 41 incorporated therein. Alternatively, as shown in FIG. 5, such a directional control valve 51 of a four-port connection two-position type may be substitutionally incorporated in the apparatus of the embodiment. The directional control valve 51 is subjected to such a change-over operation as shown in FIG. 6. More specifically, when the directional control valve 51 is changed over to a valve position (a), communication between the pocket 21 and the feed line 24 is interrupted and the pocket 21 is permitted to communicate with the discharge pipe 29, resulting in the uncoated region 15 being formed. Whereas, changing-over of the directional control valve 51 to a valve position (b) permits the pocket 21 to communicate with the feed line 24, resulting in the coated region 14 being formed.

Figure 7:
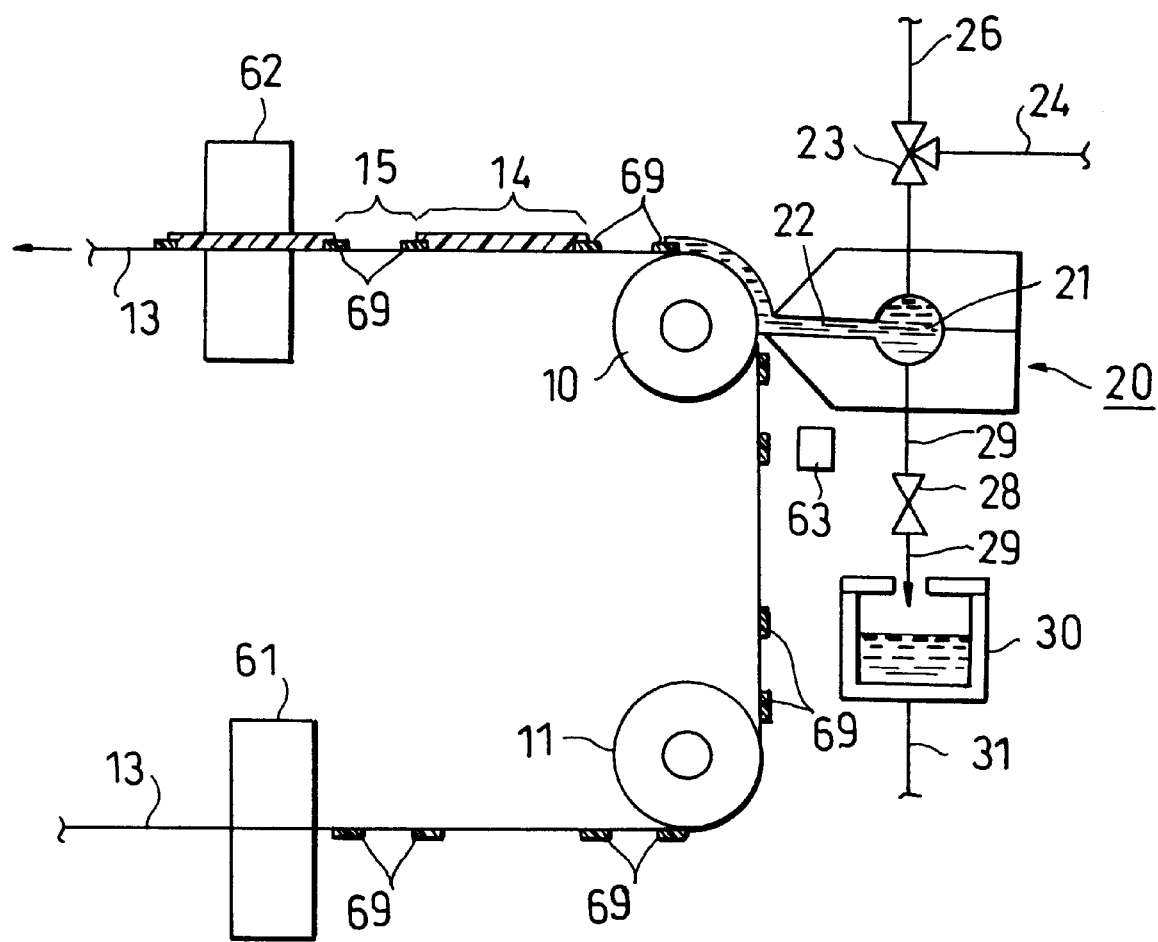
FIG. 7 is a schematic view generally showing a further embodiment of an intermittent coating apparatus according to the present invention.

Referring now to FIG. 7, a further embodiment of an intermittent coating apparatus according to the present invention is illustrated.

In an intermittent coating apparatus of the illustrated embodiment, a masking mechanism 61 is arranged at a position preceding a back-up roll 11 defined in a direction of traveling of a conductive sheet material 13 in a path of traveling of the conductive sheet 13 and a masking removing mechanism 62 is arranged at a position posterior to the back-up roll 10 in the direction of traveling of the conductive sheet material 13. Also, a tape detection sensor 63 is arranged at a position anterior to an extrusion coater 20 in the direction of travel of the conductive sheet material 13.

The masking mechanism 61 functions to apply a masking tape 69 to the conductive sheet material 13 at a position corresponding to each of a start position of a coated region 14 and an end position thereof. Application of the masking tape 69 to the conductive sheet material 13 by the masking mechanism 61 is carried out while ensuring that the masking tape 69 is formed with a lead-out element for peeling in a manner to outwardly extend in a width direction of the conductive sheet material 13. The masking tape 69 may be made of a resin material such as polyethylene or polyethylene terephthalate, paper, fabric, or the like and formed with a thickness of about 10 μm to 1 mm. The masking tape 69 may be coated one surface thereof with an adhesive or the like. Commercially available masking tapes such as Types 3180H™ and SPVN 380™ each manufactured by NITTO DENKO KABUSHIKI KAISHA, Type MTF 6045™ manufactured by Teraoka Seisakusho Kabushiki Kaisha, Type 605™ manufactured by NICHIBAN KABUSHIKI KAISHA and the like may each be suitably used as the masking tape 69.

It is a matter of course that application of the masking tape 69 to the conductive sheet material 13 may be carried out by a suitable means during a manufacturing step of the conductive sheet material 13 instead of using the masking mechanism 61.

The sensor 63 may be constructed of a photosensor, a resistance sensor or the like and functions to detect the masking tape 69 applied to the conductive sheet material 13. The sensor 63 is connected to a controller (not shown) and generates a detection signal, so that the controller controls a change-over timing of a three-way directional control valve 23 in response to the detection signal or output of the sensor 63, resulting in the start and end positions of the coated region 14 being defined on the masking tape 69. The masking removing mechanism or unit 62 functions to pinch the lead-out element for peeling of the masking tape 69 to peel the masking tape 68 from the conductive sheet material 13. Alternatively, the masking removing unit 62 may be operated in a separate step. In the illustrated embodiment, the three-way directional control valve 23 may be replaced with a solenoid operated directional control valve like the solenoid operated directional control valves 41 and 51 incorporated in the above-described embodiments.

Figure 8A:
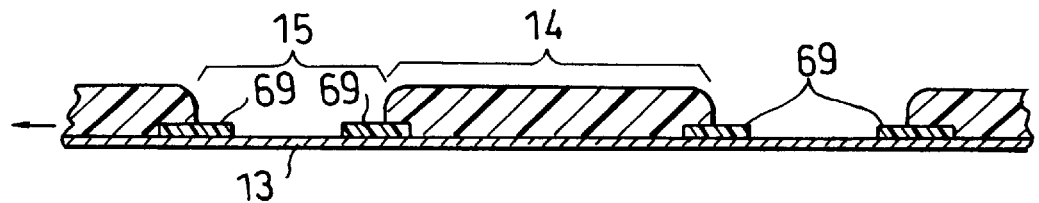
FIGS. 8A to 8D each are a schematic sectional view showing a manner of application of a masking tape to a conductive sheet material.

Now, application of the masking tape 69 to the conductive sheet material 13 will be described hereinafter with reference to FIG. 8A. Operation of the extrusion coater 20 permits the start and end positions of each of the coated regions 14 to lie on the masking tape 69, followed by removal or peeling of the masking tape 69 together with a paint or coating liquid thereon. This results in start and end positions of a coated film being provided while being formed with a distinct level difference or step after peeling of the masking tape 69. Also, loss of coating liquid may be significantly reduced as compared with conventional masking techniques, wherein not only proper regions of a conductive sheet material but also masked portions thereof are entirely coated with coating liquid. Furthermore, any suitable adjustment of a configuration of the masking tape 69 permits the coated film after the peeling to be formed into a desired shape or contour.

In the illustrated embodiment, the masking mechanism 61 and masking removing mechanism 62 per se may be constructed in any suitable manner known in the art. Also, application of the masking tape 69 and removal or peeling thereof may be carried out either automatically or manually.

Also, the illustrated embodiment, as described above, is so constructed that the masking tape 69 is detected by means of the sensor 63, of which an output is used for controlling a change-over timing of the directional control valve 23. Alternatively, it may be constructed in such a manner that application of the masking tape 69 may be carried out at a position conforming to a change-over timing of the directional control valve 23. Also, positions on both surfaces of the conductive sheet material 13 on which the masking tape 69 is applied may be deviated from each other. Further, application of the masking tape 69 to one surface of the conductive sheet material 13 may be carried out at a valve change-over timing different from that on the other surface thereof. In other words, the coated regions 14 and uncoated regions 15 on one surface of the conductive sheet material 13 may be displaced from those on the other surface thereof.

Figure 8B:
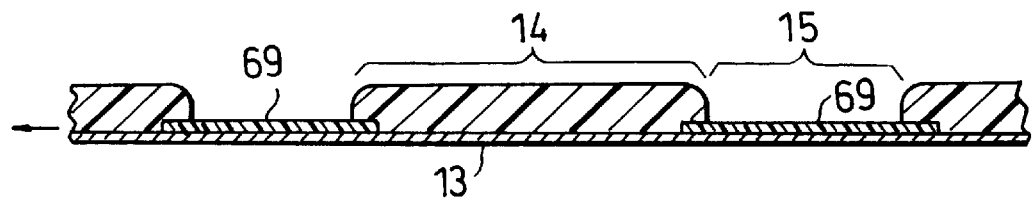
Figure 8C:
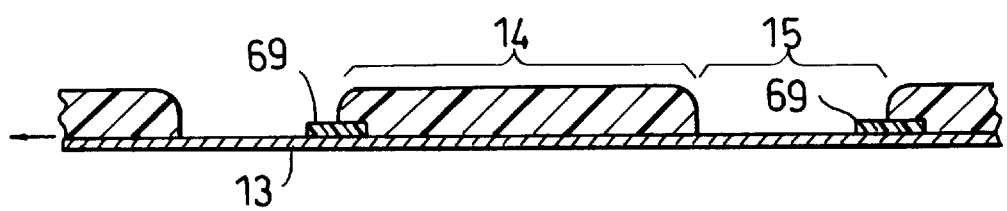
Figure 8D:
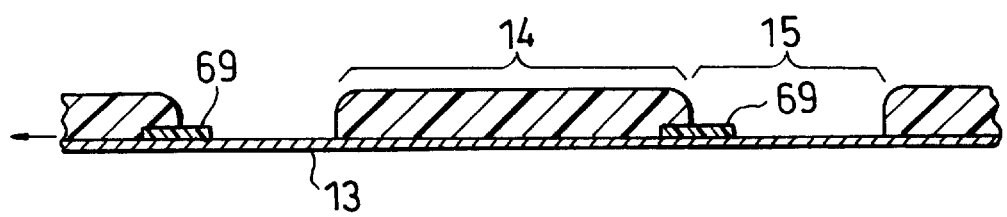
Figure 9:
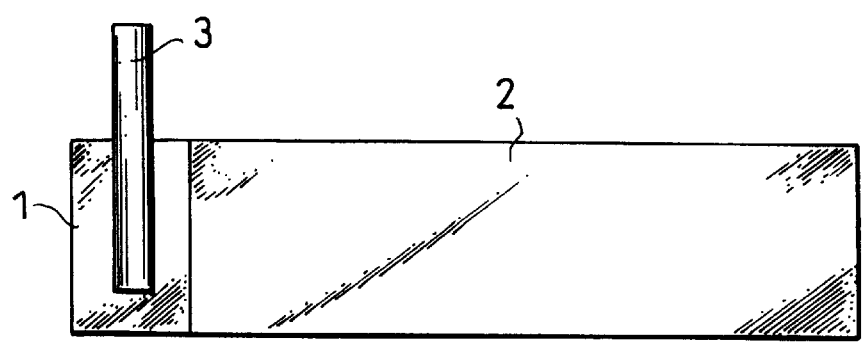
FIG. 9 is a plan view showing an electrode for a lithium ion secondary cell.

Also, a position on the conductive sheet material 13 on which the masking tape 69 is applied is not limited to a position corresponding to each of the start and end positions of the coated region 14. Application of the masking tape 69 may be carried out in such a manner as shown in each of FIGS. 8B to 8D. In FIG. 8B, the masking tape 69 is applied to the conductive sheet material 13 so as to extend all over each of the uncoated regions 15 and then coating liquid is deposited on the conductive sheet material 13 so that the start and end positions of the coated region 14 may lie on the masking tape 69. In FIG. 8C, only the start position of the coated region 14 lies on the masking tape 69; whereas in FIG. 8D, only the end position of the coated region 14 lies thereon. In each of FIGS. 8A to 8D, an arrow indicates a direction of traveling of the conductive sheet material 13.

As can be seen from the foregoing, the present invention is so constructed that the pocket of the extrusion coater intermittently communicates with the coating liquid feed pump to intermittently feed coating liquid to the pocket, to thereby alternately form the coated regions and uncoated regions on the web and, when communication between the pocket and the coating liquid feed pump is interrupted, coating liquid in the pocket is discharged through the discharge line of a decreased flow resistance provided with the shut-off valve. Such construction effectively prevents undesired feeding of coating liquid to the uncoated region beyond the end position of the coated region, resulting in a boundary between the coated region and the uncoated region being distinctly defined while ensuring satisfactory coating with increased accuracy. Also, such construction permits coating liquid to be positively isolated from an ambient atmosphere until it is forced out of the slit, to thereby prevent a variation in viscosity of coating liquid, resulting in a coated film obtained being rendered homogeneous and uniform.

In particular, the present invention may be constructed so as to apply the masking tape to the web prior to applying of coating liquid on the web, and to carry out both starting and ending of intermittent coating of coating liquid on the masking tape, to thereby permit the start and end positions of the coated region to lie on the masking tape, followed by peeling of the masking tape. Such construction permits start and end positions of a coated film formed to be distinctly and sharply defined. Also, such construction prevents coating liquid from being coated on the masked portion of the web, to thereby reduce loss of coating liquid.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An intermittent coating method to form coated and uncoated regions of a web using an extrusion coater provided with a pocket and a slit communicating with the pocket, an opening of the slit of the extrusion coater being arranged opposite to one surface of a continuously traveling web and extending in a direction perpendicular to the direction of travel of the web, comprising the steps of:

operating a coating liquid feed pump connected to a source of coating liquid so that the coating liquid feed pump alternately communicates with and transports coating liquid to a circulation line connected to a coating liquid tank and the pocket; and operating the coating liquid feed pump to transport coating liquid to the pocket which forces the coating liquid out of the opening of the slit to form coated regions on the web, followed by;

operating the coating liquid feed pump to communicate with the circulation line, and rendering the pocket open by opening the pocket to a discharge line through a shut-off valve arranged in the discharge line to reduce the pressure of coating liquid in the pocket when the coating liquid feed pump is communicating with the circulation line to form the uncoated regions of the web.

2. An intermittent coating method as defined in claim 1, wherein the coating liquid contains an active material and a binder so the coating liquid can be used for forming an electrode; and the web comprises a conductive sheet material made of one selected from the group consisting of a copper foil and an aluminum foil.

3. An intermittent coating method as defined in claim 1, further comprising the steps of:

prior to the step of operating the coating liquid feed pump to force the coating liquid out of the opening of the slit to form the coated regions on the web, applying a masking tape to the web at one or more start positions of one or more regions to be coated with said coating liquid and at one or more end positions of said one or more regions to be coated with said coating liquid; and removing the masking tape after the coated regions have been formed on the web.

4. An intermittent coating method as defined in claim 1, wherein the discharge line is connected to a sub-tank, further comprising the step of:

keeping an interior of the sub-tank at atmospheric pressure or a negative pressure less than atmospheric pressure so that an amount of coating liquid remains in the slit and pocket when the pocket is not communicating with the coating liquid feed pump.

5. An intermittent coating method to form coated and uncoated regions of a web using an extrusion coater provided with a pocket and a slit communicating with the pocket, an opening of the slit of the extrusion coater being arranged opposite to one surface of a continuously traveling web and extending in a direction perpendicular to the direction of travel of the web, comprising the steps of:

operating a coating liquid feed pump connected to a source of coating liquid so that the coating liquid feed pump alternately communicates with and transports coating liquid to a circulation line connected to a coating liquid tank and the pocket;

operating the coating liquid feed pump to transport coating liquid to the pocket which forces the coating liquid out of the opening of the slit to form coated regions of the web, followed by operating the coating liquid feed pump to communicate with the circulation line, and rendering the pocket open by opening the pocket to a discharge line through a shut-off valve arranged in the discharge line to reduce the pressure of coating liquid in the pocket when the coating liquid feed pump is communicating with the circulation line to form the uncoated regions of the web; and prior to the step of operating the coating liquid feed pump to force the coating liquid out of the opening of the slit to form the coated regions on the web, applying masking tape to the web at one or more start positions of one or more regions to be coated with said coating liquid and at one or more end positions of said one or more regions to be coated with said coating liquid;

wherein the coating liquid is applied to the web so that one or more start positions of the coated regions and one or more end positions of the coated regions are defined on the masking tape applied to the web.

\* \* \* \* \*

UNITED STATES PATENT AND TRADEMARK OFFICE
CERTIFICATE OF CORRECTION

PATENT NO. : 5,989,622
DATED : November 23, 1999
INVENTOR(S) : Iwashita et al.

It is certified that error appears in the above-identified patent and that said Letters Patent is hereby corrected as shown below:

Column 6, line 36, "130" should read "13".
Column 8, line 37, "Teraoka Seisakusho Kabushiki Kaisha" should read
--TERAOKA SEISAKUSHO KABUSHIKI KAISHA--.

Signed and Sealed this

Fifth Day of September, 2000

Attest:

Q. TODD DICKINSON

*Attesting Officer*     *Director of Patents and Trademarks*